(12) United States Patent
Letwin et al.

(10) Patent No.: US 9,616,896 B1
(45) Date of Patent: Apr. 11, 2017

(54) SYSTEM FOR SWITCHING CONTROL OF AN AUTONOMOUS VEHICLE

(71) Applicant: Uber Technologies, Inc., San Francisco, CA (US)

(72) Inventors: Nicholas Letwin, Pittsburgh, PA (US); Morgan Jones, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/070,795

(22) Filed: Mar. 15, 2016

(51) Int. Cl.
*B60W 30/182* (2012.01)
*B60W 10/06* (2006.01)
*B60W 10/18* (2012.01)
*B60W 10/20* (2006.01)
*B60W 10/10* (2012.01)

(52) U.S. Cl.
CPC .......... *B60W 30/182* (2013.01); *B60W 10/06* (2013.01); *B60W 10/10* (2013.01); *B60W 10/18* (2013.01); *B60W 10/20* (2013.01); *B60W 2600/00* (2013.01)

(58) Field of Classification Search
CPC .... B60W 30/182; B60W 10/06; B60W 10/10; B60W 10/20
USPC .......................................................... 701/23
See application file for complete search history.

(56) References Cited

U.S. PATENT DOCUMENTS

| | | | |
|---|---|---|---|
| 9,260,092 B1* | 2/2016 | Lombrozo | B60T 8/17 |
| 9,349,284 B2* | 5/2016 | Cudak | G08G 1/00 |
| 2007/0198145 A1 | 8/2007 | Norris | |
| 2010/0256836 A1 | 10/2010 | Mudalige | |
| 2011/0241862 A1 | 10/2011 | Debouk | |
| 2012/0280662 A1* | 11/2012 | Krauer | H02J 7/04 320/138 |
| 2013/0131907 A1 | 5/2013 | Green | |
| 2014/0156133 A1* | 6/2014 | Cullinane | B60W 30/00 701/23 |
| 2014/0244096 A1 | 8/2014 | An | |
| 2014/0358353 A1 | 12/2014 | Ibanez-Guzman | |
| 2015/0062168 A1* | 3/2015 | Ng-Thow-Hing | G02B 27/01 345/633 |

\* cited by examiner

*Primary Examiner* — Yazan Soofi
(74) *Attorney, Agent, or Firm* — Mahamedi IP Law LLP

(57) ABSTRACT

A control interface for a first vehicle operation of an autonomous vehicle. The control interface detects an autonomy activation signal to enable a first automated controller to control the first vehicle operation. The control interface then couples the first automated controller to a vehicle control platform configured to manage the first vehicle operation in response to input signals. For example, the control inter face may include a double-throw electromechanical relay that switchably couples the vehicle control platform to one of the first automated controller or a manual input mechanism. The control interface then provides the input signals to the vehicle control platform from the first automated controller.

20 Claims, 8 Drawing Sheets

SYSTEM FOR SWITCHING CONTROL OF AN AUTONOMOUS VEHICLE

TECHNICAL FIELD

Examples described herein relate to autonomous vehicles and, more specifically, to switching between manual and autonomous control of an autonomous vehicle.

BACKGROUND

Autonomous vehicles have replaced human drivers with computer-implemented intelligence to control and/or drive the vehicle. Autonomous vehicles typically utilize a number of sensors and other automation technology to help navigate the surrounding environment. For example, three-dimensional (3D) sensing technology may be used to map a vehicle's local environment and larger surrounding areas. The sensor information may be used to control vehicle inputs (e.g., steering, acceleration, braking, etc.) to drive the vehicle in an autonomous manner. This enables an autonomous vehicle to safely navigate and traverse terrain while avoiding both static objects (e.g., trees, structures, drop-offs, etc.) and dynamic objects (e.g., people, animals, vehicles, etc.) in its path.

Many autonomous vehicles are capable of being operated in an autonomous mode (e.g., vehicle inputs provided by one or more processors) or a manual mode (e.g., vehicle inputs provided by person physically present within the vehicle). More specifically, some autonomous vehicles may allow a user or rider of the vehicle to dynamically change the operating mode (e.g., even while the vehicle is traveling at relatively high speeds). Therefore, it may be desirable to provide an autonomous vehicle with safeguards for ensuring a relatively safe transition between autonomous and manual modes.

DETAILED DESCRIPTION

Figure 1:
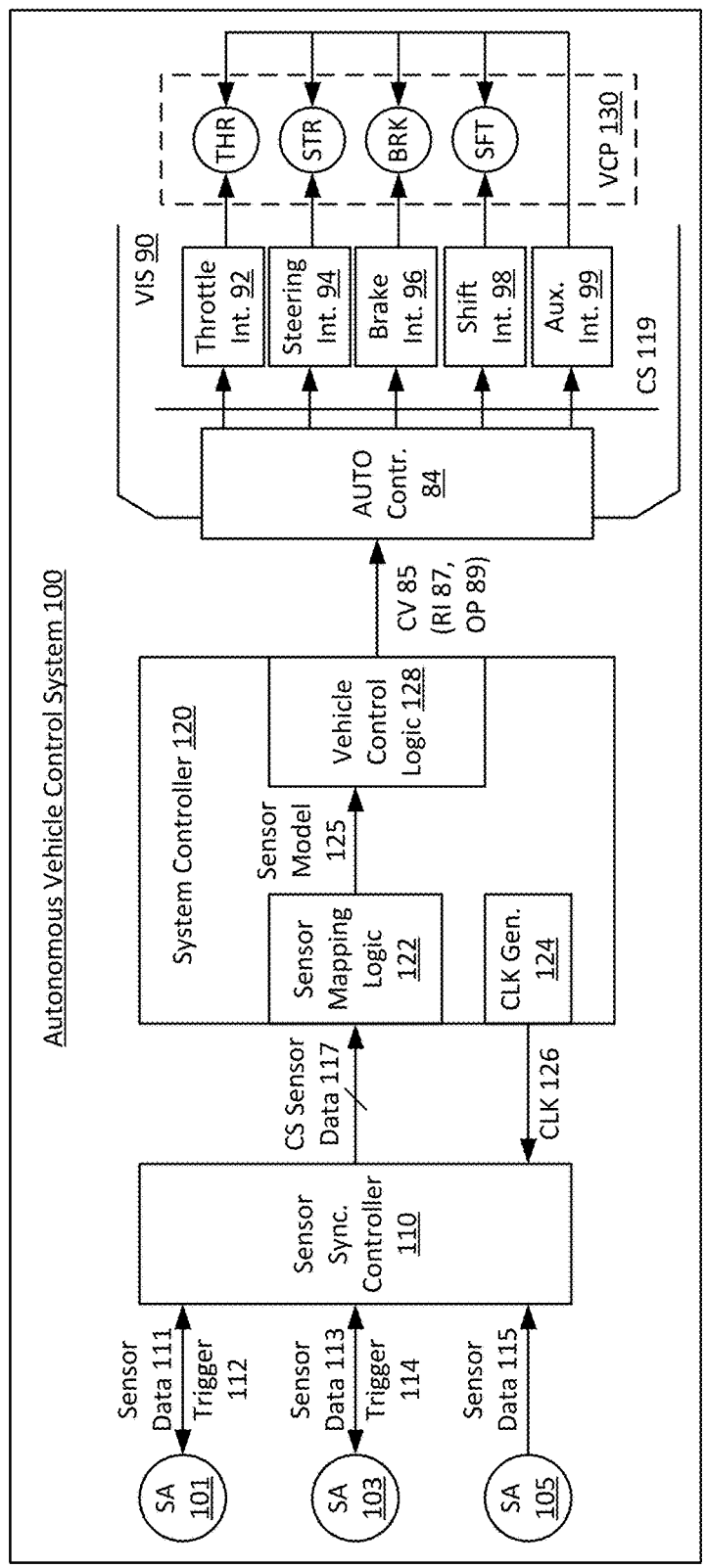
FIG. 1 shows a block diagram of a control system for operating an autonomous vehicle, in accordance with example implementations.

Examples described herein provide for a control interface that may ensure a safe transition between a manual mode and an autonomous mode of an autonomous vehicle. The control interface may detect an autonomy activation signal to enable a first automated controller to control a first vehicle operation (e.g., steering, braking, acceleration, shifting, etc.) of the autonomous vehicle. In response to the user autonomy activation signal, the control interface couples the first automated controller to a vehicle control platform configured to manage the first vehicle operation in response to input signals. The control interface then provides the inputs signals to the vehicle control platform from the first automated controller.

According to some examples, the control interface may include a double-throw electromechanical relay that switchably couples the vehicle control platform to one of the first automated controller or a manual input mechanism. For example, the relay may have a normally open position and a closed position. The vehicle control platform may be coupled to the manual input mechanism when the relay is in the open position, and may be coupled to the first automated controller when the relay is in the closed position. In some aspects, the vehicle control platform may receive the control signals from the manual input mechanism while the relay is in the open position.

The control interface may respond to the autonomy activation signal by closing the relay to enable the vehicle control platform to receive the input signals from the automated controller. In some aspects, the control interface may respond to the autonomy activation signal by further decoupling the manual input mechanism from the vehicle control platform. The control interface may further decouple the first automated controller from the vehicle control platform if the autonomy activation signal becomes deactivated.

The autonomy activation signal may indicate that the first automated controller is able to safely assume control of the first vehicle operation. In some examples, the first automated controller may correspond to one of a plurality of automated controllers for the autonomous vehicle. Further, in some aspects, the autonomy activation signal may indicate that each of the plurality of automated controllers is able to safely assume control of a respective vehicle operation.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Numerous examples are referenced herein in context of an autonomous vehicle. An autonomous vehicle refers to any vehicle which is operated in a state of automation with respect to steering and propulsion. Different levels of autonomy may exist with respect to autonomous vehicles. For example, some vehicles today enable automation in limited scenarios, such as on highways, provided that drivers are present in the vehicle. More advanced autonomous vehicles drive without any human driver inside the vehicle.

Such vehicles often are required to make advance determinations regarding how the vehicle is behave given challenging surroundings of the vehicle environment.

As described herein, a "vehicle operation" may refer to any vehicle function or operational facet that may be involved in driving and/or maneuvering a vehicle. In example implementations, each vehicle operation may be automated and/or controlled manually. For example, steering, shifting, braking, and acceleration may represent "core" vehicle operations that may be controlled by an autonomy controller (e.g., responsive to control signals generated by one or more processors) or by a user of the vehicle (e.g., responsive to user inputs provided through one or more manual input mechanisms). An "autonomous driving mode" may refer to an operational state of an autonomous vehicle in which some, if not all, of the core vehicle operations are automated.

System Description

FIG. 1 shows a block diagram of a control system 100 for operating an autonomous vehicle in accordance with example implementations. The control system 100 includes a sensor synchronization controller 110, a system controller 120, and a vehicle interface subsystem (VIS) 90. In an example of FIG. 1, the control system 100 is used to autonomously operate a vehicle (not shown for simplicity) in a given geographic region for a variety of purposes, including transport services (e.g., transport of humans, delivery services, etc.). In examples described, an autonomously operated vehicle can drive and/or navigate without human intervention. For example, in the context of automobiles, an autonomously driven vehicle can steer, accelerate, shift, brake and operate lighting components. Some variations also recognize that an autonomous-capable vehicle can be operated autonomously, manually, or a combination of both.

In an example of FIG. 1, the control system 100 utilizes a number of sensor resources to intelligently guide or navigate the vehicle through a given environment. For example, the control system may include a number of sensor apparatuses (SA) 101, 103, and 105 that generate respective sensor data 111, 113, and 115. Each sensor apparatus may include one or more sensors that may capture a particular type of information about the surrounding environment. In an example of FIG. 1, the first sensor apparatus 101 may include a number of camera modules that can capture still images and/or videos (e.g., as sensor data 111); the second sensor apparatus 103 may include a laser rangefinder that can determine distance information to nearby objects (e.g., as sensor data 113) using laser ranging techniques; and the third sensor apparatus 105 may include an inertial measurement unit (IMU) that can detect velocity, orientation, and/or gravitational information (e.g., as sensor data 115) pertaining to the autonomous vehicle.

The control system 100 of FIG. 1 is not limited to the sensors described in the examples herein. In some implementations, the control system 100 may include fewer or more sensor apparatuses and/or types of sensors than described herein with respect to FIG. 1. For example, the control system 100 may further include proximity sensors, touch sensors, photosensors, sonar, radar, rotary encoders, and/or any other sensors technology that may be used to detect and/or gather information about the surrounding environment.

In example implementations, the sensor data 111-115 may be combined to provide a computerized perception of the space and environment surrounding the vehicle. For example, the first sensor apparatus 101 may correspond, at least in part, to a machine vision camera that can be used to generate a three-dimensional (3D) representation of the surrounding environment. For example, still images (e.g., included with sensor data 111) from multiple camera modules of the first sensor apparatus 101 may be "stitched" together to generate a 3D (e.g., stereoscopic) sensor image. The 3D sensor image may indicate the size and distance of objects in the vicinity of the autonomous vehicle (e.g., within viewable range of the sensor apparatus 101). In order to generate an accurate 3D sensor image of the environment at any given time, the machine vision camera relies on sensor data that was captured or acquired at that particular instance of time. Attempting to synthesize multiple images captured at different instances of time may result in optical distortions in the 3D sensor image.

Conventional machine vision cameras operate in an asynchronous manner. For example, individual camera modules may capture images at various times and/or framerates independent of other camera modules within the machine vision camera. Thus, a processor of the machine vision camera would typically have to determine and resolve any discrepancies in the timing of sensor data received from each of the camera modules before it can use the sensor data to construct a 3D sensor image. This process becomes even less efficient as the demand for sensor data increases (e.g., due to increased framerates and/or number of camera modules). Therefore, conventional machine vision cameras may not be efficient or accurate enough for creating real-time 3D sensor images that can be used to safely navigate an autonomous vehicle, especially at high speeds (e.g., 60+ mph).

The example implementations recognize that, in order to satisfy the machine vision demands of autonomous vehicles, it may be desirable to capture sensor data from multiple sensors in a time-synchronized manner. Thus, in example implementations, activation of at least some of the sensor apparatuses 101, 103, and 105 (e.g., to capture or acquire sensor data) may be directly controlled by the control system 100 and/or sensor synchronization controller 110. In an example of FIG. 1, sensor apparatuses 101 and 103 may capture sensor data 111 and 113 in response to triggers 112 and 114, respectively, from the sensor synchronization controller 110. In some aspects, the sensor data 111 and/or 113 may be synchronized, at least in part, with a local clock signal (CLK) 126 of the control system 100. For example, the local cock signal 126 may be a shared clock signal that is used by other components and/or elements of the control system 100 for timing purposes.

In some aspects, one or more sensors of the first sensor apparatus 101 may capture sensor data at substantially the same time as other sensors of the first sensor apparatus 101. In other aspects, at least some of the sensor data 111 captured by the first sensor apparatus 101 may coincide, temporally, with at least some of the sensor data 113 captured by the second sensor apparatus 103. The time-synchronized sensor data 111 and/or 113 may be quickly and accurately combined to generate 3D sensor images that can be used for navigating the autonomous vehicle. Moreover, by controlling the precise times at which the sensor data 111 and/or 113 is captured (e.g., according to a sensor activation schedule), the control system 100 may reliably update the 3D sensor image even when the vehicle is travelling at high speeds.

The example implementations further recognize that the control system 100 may include one or more asynchronous sensors (e.g., sensor apparatus 105). For example, the third sensor apparatus 105 may not respond to triggers from the sensor synchronization controller 110. Rather, the asynchronous sensor apparatus 105 may capture sensor data 115 at preconfigured rates and/or times (e.g., in reaction to changes in the environment, based on its own internal clock, in response to manual input, etc.). In example implementations, the sensor synchronization controller 110 may determine a relative timing of the asynchronous sensor data 115 with respect to the local clock signal 126. This may enable the sensor data 115 to be used by other processors and/or components of the control system 100. For example, the sensor data 115 may be combined with similarly-timed sensor data 111 and/or 113 to generate a 3D sensor image at the given instance of time.

The sensor synchronization controller 110 may correspond to a dedicated processing resource, such as a field programmable gate array ("FPGA"), that receives and/or processes raw sensor data 111-115 received from the sensor apparatuses 101-105. More specifically, the sensor synchronization controller 110 may convert the raw sensor data 111-115 to clock-synchronized (CS) sensor data 117. In example implementations, the CS sensor data 117 may be formatted for a particular communications platform implemented by the control system 100. In some aspects, the sensor synchronization controller 110 may convert the raw sensor data 111-115 into a platform-specific format (e.g., as CS sensor data 117) by adding a timestamp to the sensor data indicating the time at which the corresponding sensor data is captured or acquired in relation to the local clock signal 126. Still further, in some aspects, the sensor synchronization controller 110 may add additional parameters or fields (e.g., header, footer, status bit, etc.) to the raw sensor data 111-115 when converting the sensor data to CS sensor data 117.

The system controller 120 may utilize the CS sensor data 117 to intelligently guide or navigate the vehicle through a given environment. For example, the system controller 120 may control one or more vehicle operations such as steering, shifting, braking, and/or acceleration as the vehicle progresses to a destination. In some aspects, the system controller 120 may trigger vehicle control actions (e.g., steering, shifting, braking, acceleration, etc.) and/or perform route planning based at least in part on the CS sensor data 117. In other aspects, the system controller 120 may use the CS sensor data 117 to provide additional inputs for the vehicle (e.g., transmissions from remote or local human operators, network communication from other vehicles, etc.). Still further, in some aspects, the system controller 120 may communicate the CS sensor data 117 to one or more remote devices.

In example implementations, the system controller 120 includes sensor mapping logic 122 and vehicle control logic 128. In some aspects, the system controller 120 may also include clock generation circuitry 124 to generate the local clock signal 126 to be used by other elements of the control system 100 (e.g., for timing purposes). The sensor mapping logic 122 creates a sensor model 125 based on the CS sensor data 117. More specifically, the sensor mapping logic 122 may combine CS sensor data 117 from multiple sensor apparatuses 101, 103, and/or 105 to create a more detailed description of the surrounding environment (e.g., provided as the sensor model 125) that can be used to navigate the vehicle through the environment. For example, the sensor model 125 may include information pertaining to detected objects in the vicinity of the vehicle and/or contextual information about the object, surroundings, and/or geographic region, for purposes of making predictive determinations to avoid collisions.

In some aspects, the sensor model 125 may include a 3D sensor image of the surrounding environment. For example, the 3D sensor image may include image data, captured by multiple camera modules (e.g., of sensor apparatus 101), stitched together to create stereoscopic images of the surrounding environment. The stereoscopic images may be used to detect the presence and/or distances of objects in the vicinity of the vehicle. In some examples, the image data may be combined with laser rangefinder data to produce a more complete picture of the surrounding environment. In some aspects, the laser rangefinder data may complement the image data for purposes of detecting objects that may not be detectable from the image data alone. In other aspects, the laser rangefinder data may be used to check or validate the image data, and vice-versa.

The vehicle control logic 128 generates vehicle commands (CV) 85 based at least in part on the sensor model 125. More specifically, the vehicle control logic 128 may control the vehicle by issuing vehicle commands 85 (e.g., instructions) that may be used to programmatically control various electromechanical interfaces of the vehicle. The vehicle commands 85 may serve as inputs to control one or more operational facets of the vehicle such as, for example, acceleration, braking, steering, shifting, and/or other auxiliary functions (e.g., turning lights on). In example implementations, the vehicle control logic 128 utilizes the sensor model 125 to navigate the vehicle through a given environment (e.g., by issuing respective vehicle commands 85). For example, the vehicle commands 85 may specify actions that correlate to one or more vehicle control mechanisms (e.g., turning a steering column, applying brake pressure, shifting gears, etc.). More specifically, the vehicle commands 85 may specify the actions, along with attributes such as magnitude, duration, directionality or other operational characteristics of the vehicle.

The vehicle interface subsystem 90 processes the vehicle commands 85 to control one or more operations of the vehicle. The vehicle interface subsystem 90 may include an autonomy (AUTO) controller 84 that processes and/or carries out the vehicle commands 85 issued by the vehicle control logic 128. More specifically, the autonomy controller 84 may generate control signals or inputs to control acceleration, steering, braking, shifting, and/or other mechanical (or electrical) functions of the vehicle. For example, while the vehicle follows a particular route, the autonomy controller 84 may continuously adjust and/or alter the movement of the vehicle in response to vehicle commands 85 provided (e.g., in real-time) by the vehicle control logic 128.

In example implementations, the autonomy controller 84 may translate the vehicle commands 85 into control signals (CS) 119 for respective control interfaces 92-99 of the vehicle interface subsystem 90. In some aspects, each of the control interfaces 92-99 may provide drive-by-wire (DBW) functionality for a respective vehicle operation. For example, each of the control interfaces 92-99 may interface with a vehicle control platform (VCP) 130 to execute or otherwise carry out the desired vehicle operation. The VCP 130 may manage and/or control one or more mechanical components of the vehicle (e.g., engine/motor, steering column, brakes, gear selector, etc.) in response to electrical signals or inputs from the control interfaces 92-99. For example, the vehicle interface subsystem 90 may include: a throttle interface 92 to control an acceleration of the vehicle via a throttle component (THR) of the VCP 130, a steering interface 94 to control a direction or heading of the vehicle via a steering component (STR) of the VCP 130, a braking interface 96 to stop or slow down the vehicle via a braking component (BRK) of the VCP 130, a shift interface 98 to change the vehicle's gears via a shifting component (SFT) of the VCP 130, and an auxiliary interface 99 to control one or more auxiliary functions of the vehicle (e.g., exterior and/or interior lights).

In some aspects, the VCP 130 may be responsive to input signals (e.g., for controlling respective vehicle operations) from the control interfaces 92-99 or from one or more manual input mechanisms, depending on the operating mode of the vehicle. For example, when operating in autonomous mode, the VCP 130 may receive the input signals from the control interfaces 92-99. This allows the control interfaces 92-99 to control the respective vehicle operations in an autonomous manner (e.g., based on vehicle commands 85 issued by the vehicle control logic 128). On the other hand, when operating in manual mode, the VCP 130 may receive the input signals from one or more manual input mechanisms (e.g., gas/brake pedals, steering wheel, gear selector, etc.). This allows a user or rider of the vehicle to manually control the respective vehicle operations.

The examples herein recognize that rider safety is of paramount importance when operating an autonomous vehicle. For example, it may be desirable to ensure that each of the components of the vehicle control system 100 is functioning properly before allowing a user to engage or activate an autonomous driving mode. In the event of a failure or loss of communication by one or more components of the control system 100, it may be desirable to disengage the autonomous driving mode and/or ensure that the autonomous driving mode cannot be activated until all of the components of the control system 100 are properly functioning again.

In example implementations, the autonomy controller 84 may implement one or more safety features to control the transition between autonomous mode and manual mode. In some aspects, the transition from manual to autonomous control of the vehicle may be performed in multiple stages. To prevent the autonomy controller 84 from assuming autonomous control of the vehicle when a user is unprepared, one or more stages may require user inputs to transition to the next stage. During an intermediate stage, the autonomy controller 84 may check to ensure that one or more autonomy components (e.g., control interfaces 92-99) are able to safely assume control of their respective vehicle operations. Still further, in some aspects, a mechanical switching mechanism may be used for toggling between autonomous and manual control of the vehicle operations. For example the mechanical switching mechanism may provide a highly reliable and detectable "safety override" or "kill switch" to prevent the autonomy controller 84 from assuming control of the vehicle in an unsafe manner.

Figure 2:
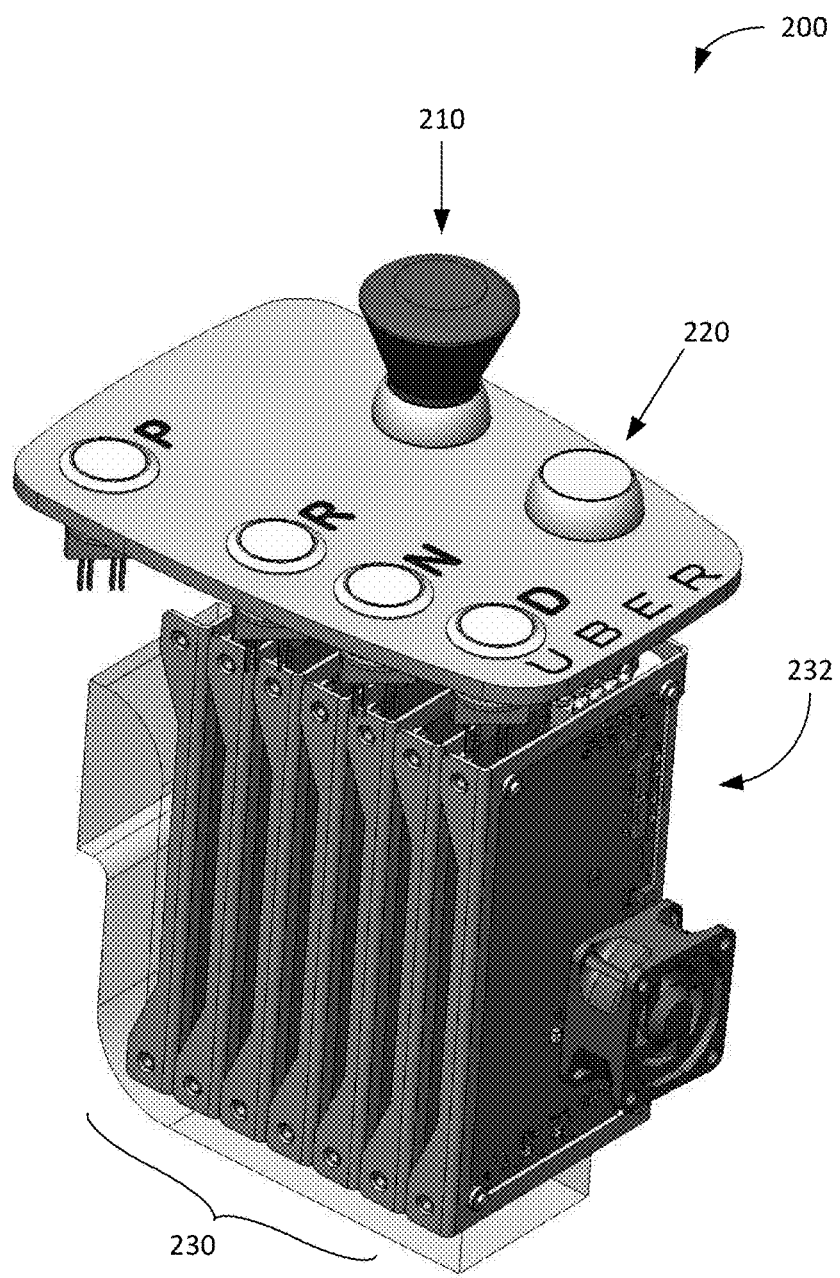
FIG. 2 shows an example user interface device that may be used to selectively operate an autonomous vehicle in an autonomous mode or a manual mode.

FIG. 2 shows an example user interface (UI) device 200 that may be used to selectively operate an autonomous vehicle in an autonomous mode or a manual mode. For some implementations, the UI device 200 may be used to retrofit, and provide autonomous driving functionality to, existing vehicles. For example, the UI device 200 may replace the gear selector and/or center console of a conventional automobile. The UI device 200 includes an autonomy (AUTO) enable button 210, and AUTO engage button 220, a number of interface modules 230, and an autonomy controller 232. For example, each of the interface modules 230 may correspond to a respective one of the control interfaces 92-99 depicted in FIG. 1, and the autonomy controller 232 may correspond to autonomy controller 84 of FIG. 1.

The AUTO enable button 210 may allow a user to enable and/or disable an autonomous driving mode. In some aspects, the AUTO enable button 210 may be a two-position button or switch that allows the user to toggle the autonomous driving mode "on" or "off." For example, the user may input a request to enable the autonomous driving mode by pulling the AUTO enable button 210 (e.g., so that the AUTO enable button 210 is in an "up" or "on" position). Upon detecting the enable request, an autonomy controller 232 may check the condition of each of the interface modules 230 to ensure that the interface modules 230 are able and/or ready to safely assume control over respective vehicle operations. In example implementations, the autonomy controller 232 may enable the autonomous driving mode only if each of the interface modules 230 is in a "ready" condition.

The AUTO engage button 220 may allow the user to engage or activate the autonomous driving mode. In some aspects, the AUTO engage button 220 may be a spring-loaded button or switch that the user presses once to engage the autonomous driving mode. In example implementations, the user may engage the autonomous driving mode only while the autonomous driving mode is enabled (e.g., each of the interface modules 230 is in a "ready" condition). For example, upon enabling the autonomous driving mode, the autonomy controller 232 may cause the AUTO engage button 220 (or separate status indicator) to light up, indicating that the vehicle can safely transition to autonomous mode. On the other hand, the autonomy controller 232 may prevent the autonomous driving mode from be engaged if at least one of the interface modules 230 is not in a "ready" condition.

In example implementations, the user may disengage and/or disable the autonomous driving mode at any time (e.g., to assume manual control of the vehicle). For example, the autonomy controller 232 may disengage the autonomous driving mode upon detecting user inputs via any of the vehicle's manual input mechanisms (e.g., brake/gas pedals, steering wheel, gear selector, etc.). Still further, the user may disable the autonomous driving mode by pushing the AUTO enable button 210 (e.g., so that the AUTO enable button 210 is in a "down" or "off" position). While the autonomous driving mode is disabled, the interface modules 230 are prevented from assuming control of vehicle operations.

Figure 3:
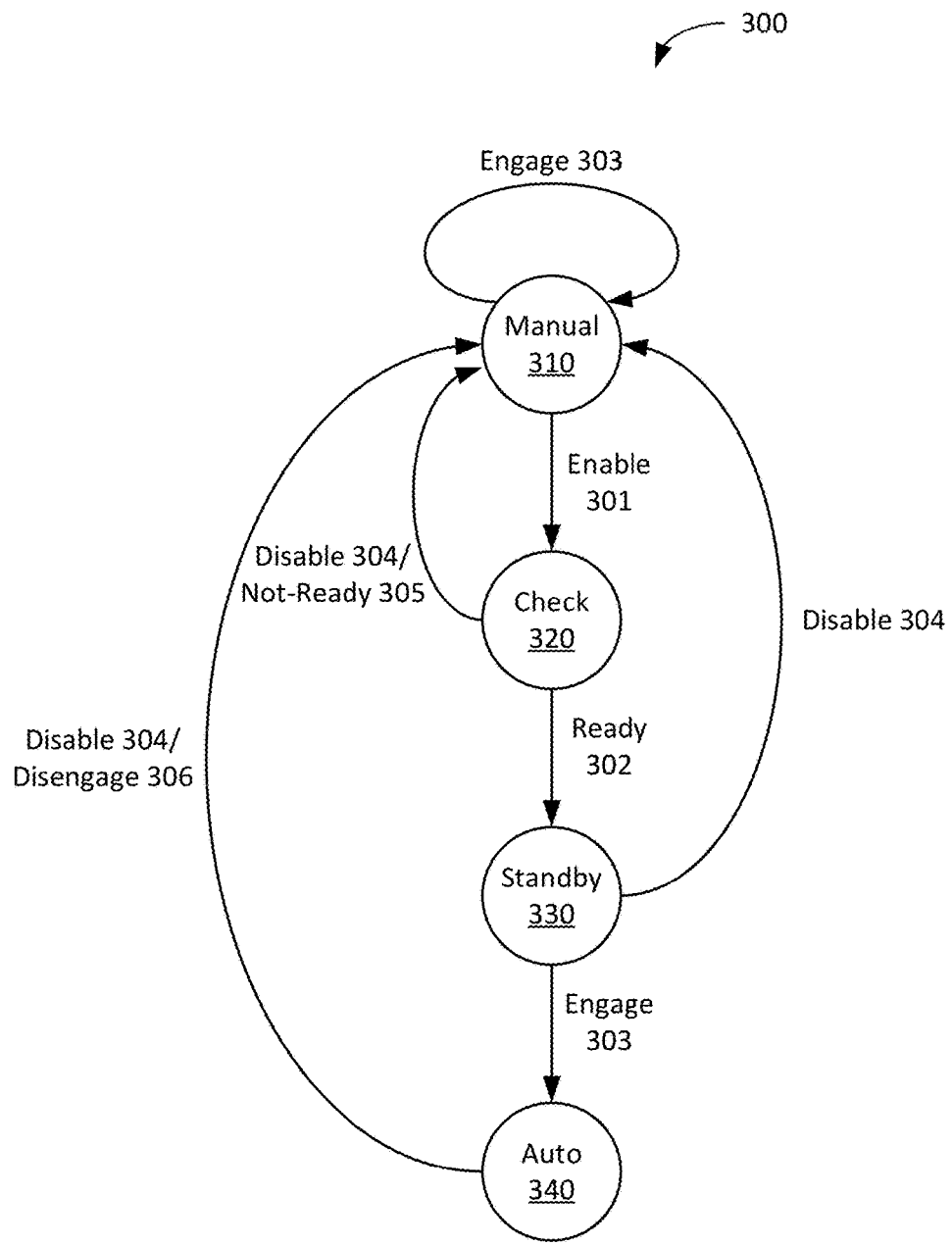
FIG. 3 shows a state diagram depicting an example operation for transitioning between manual and autonomous driving modes.

FIG. 3 shows a state diagram depicting an example operation 300 for transitioning between manual and autonomous driving modes. For example, the state diagram 300 may be implemented on an autonomous vehicle through inputs and/or actions performed via the UI device 200 of FIG. 2. In the example of FIG. 3, an autonomous vehicle may be operable in a manual state 310, a check state 320, a standby state 330, or an autonomous state 340.

In the manual state 310, vehicle operations may be responsive only to user inputs provided through one or more manual input mechanisms (e.g., brake/gas pedals, steering wheel, gear selector, etc.). For example, the manual state 310 may be activated when the AUTO enable button 210 is in a "down" or "off" position. While operating in the manual state 310, any attempt to engage the autonomous driving mode (e.g., by performing an engage action 302) may be disregarded and/or returns the autonomous vehicle to the manual state 310. From the manual state 310, the autonomous vehicle may transition only to the check state 320.

The autonomous vehicle may transition from the manual state 310 to the check state 320 in response to an enable action 301. For example, the enable action 301 may correspond to a user pulling the AUTO enable button 210. Thus, the check state 320 may be activated when the AUTO enable button 210 is in an "up" or "on" position. In the check state 320, vehicle operations may continue to be controlled via the one or more manual input mechanisms. However, upon entering the check state 320, an autonomy controller 232 may check the condition of each of the interface modules 230 to determine whether the autonomous vehicle is able to safely engage the autonomous driving mode. If the autonomy controller 232 determines that one or more of the interface modules 230 is unable to safely assume control of a respective vehicle operation, the autonomy controller 232 may trigger a not-ready action 305 to return the autonomous vehicle to the manual state 310. The autonomous vehicle may also return to the manual state 310, from the check state 320, in response to a disable action 304. For example, the disable action 304 may correspond to a user pressing the AUTO enable button 210.

The autonomous vehicle may transition from the check state 320 to the standby state 330 in response to a ready action 302. For example, the ready action 302 may be triggered by the autonomy controller 232 upon determining that each of the interface modules 230 is able to safely assume control of a respective vehicle operation. The autonomous vehicle may also return to the manual state 310, from the standby state 330, in response to a disable action 304. While operating in the standby state 330, vehicle operations may continue to be controlled via the one or more manual input mechanisms. However, the user may engage the autonomous driving mode at any time from the standby state 330. More specifically, the standby state 330 may ensure that the autonomous vehicle does not engage the autonomous driving mode while the user is unprepared for the transition. For example, while operating in the standby state 330, the autonomy controller 232 may activate a status indicator to signal to the user that the autonomous vehicle is ready to engage the autonomous driving mode.

The autonomous vehicle may transition from the standby state 330 to the autonomous state 340 in response to an engage action 303. For example, the engage action 303 may correspond to a user pressing the AUTO engage button 220. Upon transitioning to the autonomous state 340, control of the vehicle operations is passed from the one or more manual input mechanisms to the autonomy controller 232 and/or interface modules 230. In example implementations, the transition may be carried out by toggling a mechanical switch or relay to couple the interface modules 230 to a vehicle control platform (e.g., VCP 130 of FIG. 1), and decouple the one or more manual input mechanisms from the vehicle control platform. Thus, while operating in the autonomous state 340, the vehicle operations may be responsive to control signals provided by the interface modules 230 and/or autonomy controller 232.

The autonomous vehicle may return to the manual state 310, from the autonomous state 340, at any time in response to a disable action 304 and/or a disengage action 306. For example, the disengage action 306 may be triggered by the autonomy controller 232 upon detecting a user input via the one or more manual input mechanisms and/or detecting a failure or fault condition in one or more of the interface modules 230. In example implementations, the autonomous vehicle may transition only to the manual state 310 from the autonomous state 340. This may ensure that autonomous vehicle transitions through each of the intermediate states 320 and 330 (e.g., to enforce safety measures) before the autonomous state 340 can be engaged again.

Figure 4:
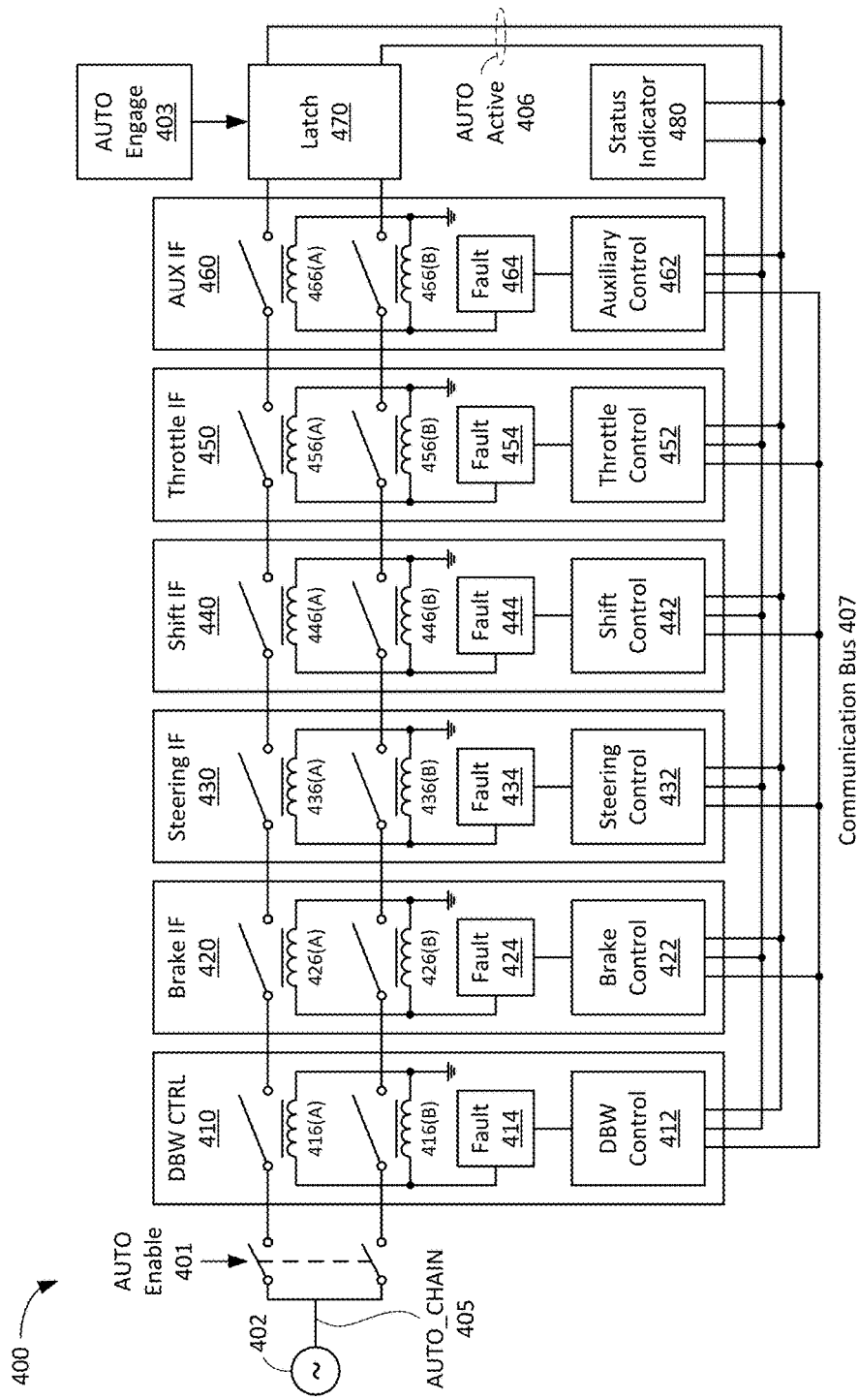
FIG. 4 shows a circuit diagram of a vehicle interface subsystem for an autonomous vehicle, in accordance with example implementations.

FIG. 4 shows a circuit diagram of a vehicle interface subsystem (VIS) 400 for an autonomous vehicle, in accordance with example implementations. The VIS 400 may be an example implementation of VIS 90 of FIG. 1. The VIS 400 includes a drive-by-wire (DBW) controller 410 and a number of interface modules 420-460. Each of the interface modules 420-460 may be an example implementation of a respective one of the control interfaces 92-99 depicted in FIG. 1.

In the example of FIG. 4, the DBW controller 410 is coupled to a brake interface (IF) 420, a steering interface 430, a shift interface 440, a throttle interface 450, and an auxiliary (AUX) interface 460. Each of the interface modules 420-460 may control a respective vehicle operation and/or function (e.g., braking, steering, shifting, acceleration, lighting, etc.). The interface modules 420-460 shown in FIG. 4 may correspond with "core" vehicle operations (e.g., braking, steering shifting, acceleration, and lighting). However, in other implementations, the VIS 400 may include fewer or more interface modules than those depicted in FIG. 4.

The DBW controller 410 and interface modules 420-460 are coupled, in series, to an AUTO_CHAIN 405. In example implementations, the AUTO_CHAIN 405 is a segmented signal line (e.g., cable, wire, or connector) that may be used to enable an autonomous driving mode (e.g., when "activated") and/or disable the autonomous driving mode (e.g., when "deactivated"). For example, a user may initiate or trigger a transition to the autonomous driving mode by closing an AUTO enable switch 401. In some aspects, the AUTO enable switch 401 may correspond to the AUTO enable button 210 of FIG. 2. For example, the user may close the AUTO enable switch 401 by pulling the AUTO enable button 210 (e.g., so that the AUTO enable button 210 is in the "up" or "on" position). Closing the AUTO enable switch 401 couples a power source 402 to the DBW controller 410 via the AUTO_CHAIN 405.

The DBW controller 410 includes a DBW control module 412, a fault detection module 414, and a pair of relays 416(A) and 416(B) coupled to the AUTO_CHAIN 405. The DBW control module 412 is coupled to each of the interface modules 420-460 via a communication bus 407. In some aspects, the DBW control module 412 may manage and/or control the interface modules 420-460 to carry out respective vehicle operations in a coordinated manner. For example, the DBW control module 412 may coordinate the amounts of brake, steering, shift, and/or accelerator inputs applied by respective interface modules 420-460, at any given time, to safely maneuver the autonomous vehicle through a given environment. In some aspects, the DBW control module 412 may generate control signals (e.g., CS 119) that may be used to control an operation of each the interface modules 420-460.

The fault detection module 414 may monitor a condition of the DBW control module 412 to determine whether the DBW control module 412 can safely manage the interface modules 420-460. For example, the DBW control module 412 may be in a "ready" condition if it is functioning properly (e.g., software for executing the DBW control module 412 is up and running) and is able to communicate with each of the interface modules 420-460 (e.g., interface modules 420-460 are able to receive instructions/control signals from the DBW control module 412). In some aspects, the fault detection module 414 may determine the current condition of the DBW control module 412 upon detecting a voltage (e.g., from voltage source 402) on the AUTO_CHAIN 405.

In example implementations, the fault detection module 414 may control (e.g., open or close) the relays 416(A) and 416(B) based on the condition of the DBW control module 412. For example, upon sensing the voltage on the AUTO_CHAIN 405, the fault detection module 414 may close the relays 416(A) and 416(B) (e.g., by charging the coils) only if the DBW control module 412 is in the "ready" condition at the time. Closing the relays 416(A) and 416(B) allows the voltage on the AUTO_CHAIN 405 to be passed to the next interface module (e.g., brake interface 420) along the chain. If the DBW control module 412 is not in the "ready" condition, the fault detection module 414 may maintain the relays 416(A) and 416(B) in an open position (e.g., by grounding the coils), thereby "breaking" the AUTO_CHAIN 405.

The brake interface 420 includes a brake control module 422, a fault detection module 424, and a pair of relays 426(A) and 426(B) coupled to the AUTO_CHAIN 405. The brake control module 422 is coupled to the communication bus 407 and may receive instructions and/or control signals from the DBW control module 412. In some aspects, the brake control module 422 may generate brake input signals, based on control signals from the DBW control module 412, to control a braking operation of the autonomous vehicle. For example, the brake control module 422 may provide the brake input signals to a vehicle control platform (not shown for simplicity) that applies an amount of brake pressure to the vehicle's brakes based on the input signals.

The fault detection module 424 may monitor a condition of the brake control module 422 to determine whether the brake control module 422 can safely assume control of the vehicle's braking operations (e.g., in an autonomous manner). For example, the brake control module 422 may be in a "ready" condition if its software is functioning properly, is able to communicate with the DBW control module 412 and other interface modules 430-460, and no manual override has been detected for the braking operation. For example, a manual override for the braking operation may correspond with a user providing braking inputs through a manual input mechanism (e.g., by operating a brake pedal). In some aspects, the fault detection module 424 may determine the current condition of the brake control module 422 upon detecting a voltage (e.g., from the DBW controller 410) on the AUTO_CHAIN 405.

In example implementations, the fault detection module 424 may control (e.g., open or close) the relays 426(A) and 426(B) based on the condition of the brake control module 422. For example, upon sensing the voltage on the AUTO_CHAIN 405, the fault detection module 424 may close the relays 426(A) and 426(B) only if the brake control module 422 is in the "ready" condition at the time. As described above, closing the relays 426(A) and 426(B) allows the voltage on the AUTO_CHAIN 405 to be passed to the next interface module (e.g., steering interface 430) along the chain. If the brake control module 422 is not in the "ready" condition, the fault detection module 424 may maintain the relays 426(A) and 426(B) in an open position, thereby breaking the AUTO_CHAIN 405.

The steering interface 430 includes a steering control module 432, a fault detection module 434, and a pair of relays 436(A) and 436(B) coupled to the AUTO_CHAIN 405. The steering control module 432 is coupled to the communication bus 407 and may receive instructions and/or control signals from the DBW control module 412. In some aspects, the steering control module 432 may generate steering input signals, based on control signals from the DBW control module 412, to control a steering operation of the autonomous vehicle. For example, the steering control module 432 may provide the steering input signals to the vehicle control platform, which steers or turns the front (and/or rear) wheels of the vehicle based on the input signals.

The fault detection module 434 may monitor a condition of the steering control module 432 to determine whether the steering control module 432 can safely assume control of the vehicle's steering operations (e.g., in an autonomous manner). For example, the steering control module 432 may be in a "ready" condition if its software is functioning properly, is able to communicate with the DBW control module 412 and other interface modules 420, 440-460, and no manual override has been detected for the steering operation. For example, a manual override for the steering operation may correspond with a user providing steering inputs through a manual input mechanism (e.g., by operating a steering wheel). In some aspects, the fault detection module 434 may determine the current condition of the steering control module 432 upon detecting a voltage (e.g., from the brake interface 420) on the AUTO_CHAIN 405.

In example implementations, the fault detection module 434 may control (e.g., open or close) the relays 436(A) and 436(B) based on the condition of the steering control module 432. For example, upon sensing the voltage on the AUTO_CHAIN 405, the fault detection module 434 may close the relays 436(A) and 436(B) only if the steering control module 432 is in the "ready" condition at the time. As described above, closing the relays 436(A) and 436(B) allows the voltage on the AUTO_CHAIN 405 to be passed to the next interface module (e.g., shift interface 440) along the chain. If the steering control module 432 is not in the "ready" condition, the fault detection module 434 may maintain the relays 436(A) and 436(B) in an open position, thereby breaking the AUTO_CHAIN 405.

The shift interface 440 includes a shift control module 442, a fault detection module 444, and a pair of relays 446(A) and 446(B) coupled to the AUTO_CHAIN 405. The shift control module 442 is coupled to the communication bus 407 and may receive instructions and/or control signals from the DBW control module 412. In some aspects, the shift control module 442 may generate shift input signals, based on control signals from the DBW control module 412, to control a gear selection operation of the autonomous vehicle. For example, the shift control module 442 may provide the shift input signals to the vehicle control platform, which changes the vehicle's gears based on the input signals.

The fault detection module 444 may monitor a condition of the shift control module 442 to determine whether the shift control module 442 can safely assume control of the vehicle's steering operations (e.g., in an autonomous manner). For example, the shift control module 442 may be in a "ready" condition if its software is functioning properly, is able to communicate with the DBW control module 412 and other interface modules 420, 430, 450, 460, and no manual override has been detected for the shifting operation. For example, a manual override for the shifting operation may correspond with a user providing shift inputs through a manual input mechanism (e.g., by operating gear selector). In some aspects, the fault detection module 444 may determine the current condition of the shift control module 442 upon detecting a voltage (e.g., from the steering interface 430) on the AUTO_CHAIN 405.

In example implementations, the fault detection module 444 may control (e.g., open or close) the relays 446(A) and 446(B) based on the condition of the shift control module 442. For example, upon sensing the voltage on the AUTO_CHAIN 405, the fault detection module 444 may close the relays 446(A) and 446(B) only if the shift control module 442 is in the "ready" condition at the time. As described above, closing the relays 446(A) and 446(B)

allows the voltage on the AUTO_CHAIN 405 to be passed to the next interface module (e.g., throttle interface 450) along the chain. If the shift control module 442 is not in the "ready" condition, the fault detection module 444 may maintain the relays 446(A) and 446(B) in an open position, thereby breaking the AUTO_CHAIN 405.

The throttle interface 450 includes a throttle control module 452, a fault detection module 454, and a pair of relays 456(A) and 456(B) coupled to the AUTO_CHAIN 405. The throttle control module 452 is coupled to the communication bus 407 and may receive instructions and/or control signals from the DBW control module 412. In some aspects, the throttle control module 452 may generate throttle input signals, based on control signals from the DBW control module 412, to control an acceleration operation of the autonomous vehicle. For example, the throttle control module 452 may provide the throttle input signals to the vehicle control platform, which increases (or decreases) the speed of the vehicle's engine and/or motor based on the input signals.

The fault detection module 454 may monitor a condition of the throttle control module 452 to determine whether the throttle control module 452 can safely assume control of the vehicle's throttle operations (e.g., in an autonomous manner). For example, the throttle control module 452 may be in a "ready" condition if its software is functioning properly, is able to communicate with the DBW control module 412 and other interface modules 420-440, 460, and no manual override has been detected for the throttle operation. For example, a manual override for the throttle operation may correspond with a user providing throttle inputs through a manual input mechanism (e.g., by operating a gas pedal). In some aspects, the fault detection module 454 may determine the current condition of the throttle control module 452 upon detecting a voltage (e.g., from the shift interface 440) on the AUTO_CHAIN 405.

In example implementations, the fault detection module 454 may control (e.g., open or close) the relays 456(A) and 456(B) based on the condition of the throttle control module 452. For example, upon sensing the voltage on the AUTO_CHAIN 405, the fault detection module 454 may close the relays 456(A) and 456(B) only if the throttle control module 452 is in the "ready" condition at the time. As described above, closing the relays 456(A) and 456(B) allows the voltage on the AUTO_CHAIN 405 to be passed to the next interface module (e.g., AUX interface 460) along the chain. If the throttle control module 452 is not in the "ready" condition, the fault detection module 454 may maintain the relays 456(A) and 456(B) in an open position, thereby breaking the AUTO_CHAIN 405.

The AUX interface 460 includes an auxiliary control module 462, a fault detection module 464, and a pair of relays 466(A) and 466(B) coupled to the AUTO_CHAIN 405. The auxiliary control module 462 is coupled to the communication bus 407 and may receive instructions and/or control signals form the DBW control module 412. In some aspects, the auxiliary control module 462 may generate auxiliary input signals, based on control signals from the DBW control module 412, to control one or more auxiliary (e.g., lighting) operations of the autonomous vehicle. For example, the auxiliary control module 462 may provide the auxiliary input signals to the vehicle control platform, which turns on or off the vehicle's headlights based on the input signals.

The fault detection module 464 may monitor a condition of the auxiliary control module 462 to determine whether the auxiliary control module 462 can safely assume control of the vehicle's auxiliary operations (e.g., in an autonomous manner). For example, the auxiliary control module 462 may be in a "ready" condition if its software is functioning properly, is able to communicate with the DBW control module 412 and other interface modules 420-450, and no manual override has been detected for the auxiliary operation. For example, a manual override for the auxiliary operation may correspond with a user providing auxiliary inputs through a manual input mechanism (e.g., by operating a light switch). In some aspects, the fault detection module 464 may determine the current condition of the auxiliary control module 462 upon detecting a voltage (e.g., from the throttle interface 450) on the AUTO_CHAIN 405.

In example implementations, the fault detection module 464 may control (e.g., open or close) the relays 466(A) and 466(B) based on the condition of the auxiliary control module 462. For example, upon sensing the voltage on the AUTO_CHAIN 405, the fault detection module 462 may close the relays 466(A) and 466(B) only if the auxiliary control module 462 is in the "ready" condition at the time. In some aspects, closing the relays 466(A) and 466(B) allows the voltage on the AUTO_CHAIN 405 to be detected and/or stored by a latch 470 coupled to the AUTO_CHAIN 405. If the auxiliary control module 462 is not in the "ready" condition, the fault detection module 464 may maintain the relays 466(A) and 466(B) in an open position, thereby breaking the AUTO_CHAIN 405.

The latch 470 may detect and/or store the state of the AUTO_CHAIN 405 to enable or disable an autonomous driving mode. For example, the AUTO_CHAIN 405 may be "activated" when the latch 470 is able to detect the voltage (e.g., from the voltage source 402) across the length of the AUTO_CHAIN 405. On the other hand, the AUTO_CHAIN 405 may be "deactivated" when the latch 470 is unable to detect the voltage on the AUTO_CHAIN 405. In example implementations, the latch 470 may enable the autonomous driving mode only when the AUTO_CHAIN 405 is activated (e.g., relays 416(A)/416(B), 426(A)/426(B), 436(A)/436(B), 446(A)/446(B), 456(A)/456(B), 466(A)/466(B) and the AUTO enable switch 401 are closed). As described above, a user may engage or activate the autonomous driving mode (e.g., to transfer control of the vehicle to the autonomy controller 84 and/or DBW controller 410) at any time while the autonomous driving mode is in the enabled state.

Any of the interface modules 420-460 and/or the DBW controller 410 may break the AUTO_CHAIN 405, and thus disable the autonomous driving mode, by opening its respective relays. In some aspects, each of the relays may be a normally-open (NO) electromechanical (e.g., spring-loaded) relay that closes when energized and springs open when de-energized and/or upon loss of power. Thus, in the event of a failure and/or loss of power in the DBW controller 410 and/or any of the interface modules 420-460, the respective relays may revert to an open state and break the AUTO_CHAIN 405 (e.g., thus disabling the autonomous driving mode). This may ensure that the autonomous vehicle reverts to manual control in the event of a fault or failure in the autonomous vehicle control system.

The relay pairs provide redundancy (e.g., added safety) to the AUTO_CHAIN 405. For example, each relay in a relay pair is coupled to a respective "line" of the AUTO_CHAIN 405. This may ensure that the interface module 420-460 and/or DBW controller 410 has a greater chance of breaking at least one of the lines (e.g., upper or lower) of the AUTO_CHAIN 405, upon detecting a fault condition, even if one of the relays fails to open. Thus, in example implementations, the latch 470 may enable the autonomous driving mode only if both the upper and lower lines of the AUTO_CHAIN 405 are activated. If the latch 470 fails to detect a voltage on at least one of the portions of the AUTO_CHAIN 405, the latch 470 may disable the autonomous driving mode.

In example implementations, a user may engage or activate the autonomous driving mode by operating or activating an AUTO engage input mechanism 403. In some aspects, the AUTO engage input mechanism 403 may correspond to the AUTO engage button 220 of FIG. 2. For example, the user may activate the AUTO engage input mechanism 403 by pressing the AUTO engage button 220. More specifically, activating the AUTO engage device 403 may cause the latch 470 to output AUTO activation signals 406 to the DBW controller 410 and each of the interface modules 420-460. The state of the AUTO activation signals 406 may depend on the state of the AUTO_CHAIN 405. For example, the latch 470 may assert the AUTO activation signals 406 only if the AUTO_CHAIN 405 is activated (e.g., the autonomous driving mode is enabled). On the other hand, the latch 470 may not assert the AUTO activation signals 406 if it fails to detect a voltage on any of the lines of the AUTO_CHAIN 405 (e.g., regardless of the state of the AUTO engage input mechanism 403).

Each of the interface modules 420-460 may assume control of a respective vehicle operation upon detecting the AUTO activation signals 406. For example, the interface modules 420-460 may assume control of the vehicle operations by coupling the respective control modules 422, 432, 442, 452, and 462 to a vehicle control platform (e.g., VCP 130 of FIG. 1) and/or decoupling one or more manual input mechanisms from the vehicle control platform. In some examples, a status indicator 480 may light up or otherwise signal to the user that the autonomous vehicle has engaged the autonomous driving mode. For example, the status indicator 480 may be coupled to receive the AUTO activation signals 406 from the latch 470.

In some implementations, the interface modules 420-460 may revert to a "not ready" condition if an AUTO activation signal 406 is not detected within a given duration after entering the "ready" condition. For example, if at least one of the DBW controller 410 or interface modules 420-460 is not in the "ready" condition during an initial system check (e.g., in response to the user closing the AUTO enable switch 401), the AUTO_CHAIN 405 is broken and the AUTO activation signals 406 remain deasserted. As a result, the DBW controller 410 and each of the interface modules 420-460 may revert to a "not ready" condition (e.g., by opening their respective relays). This may require the entire system check to be performed each time a user wishes to enable the autonomous driving mode (e.g., to ensure that the DBW controller 410 and interface modules 420-460 are properly functioning at the same time).

Figure 5:
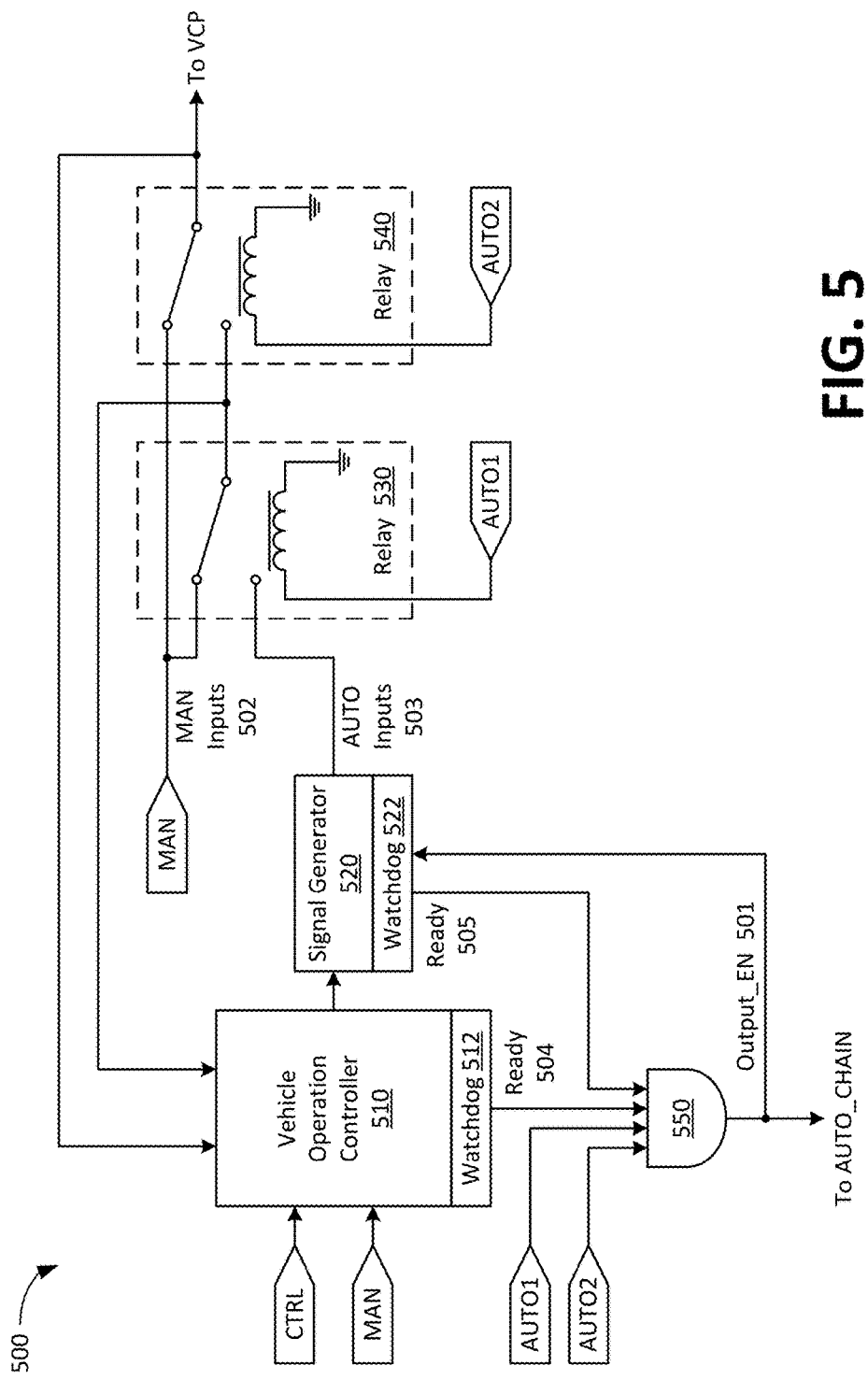
FIG. 5 shows a circuit diagram of an interface module for a vehicle operation of an autonomous vehicle, in accordance with example implementations.

FIG. 5 shows a circuit diagram of an interface module 500 for a vehicle operation of an autonomous vehicle, in accordance with example implementations. The interface module 500 may be an example implementation of one of the interface modules 420-460 of FIG. 4. The interface module 500 includes a vehicle operation controller 510, a signal generator 520, and relays 530 and 540.

The vehicle operation controller 510 may translate control (CTRL) signals (e.g., received from autonomy controller 84 and/or DBW controller 410) to input signals that may be used to control a particular vehicle operation (e.g., braking, steering, shifting, acceleration, lighting, etc.). For example, the vehicle operation controller 510 may decode the received CTRL signals for the particular vehicle operation. The vehicle operation controller 510 further causes the signal generator 520 to generate autonomy (AUTO) input signals 503 based on the decoded CTRL signals.

The relays 530 and 540 are coupled to the signal generator 520 and a manual input mechanism (not shown for simplicity). Specifically, the relays 530 and 540 may switchably couple the signal generator 520 or the manual input mechanism to a VCP (not shown for simplicity). In example implementations, each of the relays 530 and 540 may be an electromechanical (e.g., spring-loaded) double-throw relay that is operated in response to an AUTO activation signal AUTO1 or AUTO2, respectively. For example, the AUTO activation signals AUTO1 and AUTO2 may correspond to AUTO activation signals 406 of FIG. 4. Thus, the AUTO activation signals AUTO1 and AUTO2 may be asserted or activated when an autonomous driving mode is engaged, and may be deasserted or deactivated when the autonomous driving mode is disengaged.

The relays 530 and 540 may be in an "open" position or a "closed" position depending on the state of the AUTO activation signals AUTO1 and AUTO2. For example, the relays 530 and 540 may be in the open position while the AUTO activation signals AUTO1 and AUTO2 are deasserted (e.g., the autonomous driving mode is disengaged), and may switch to the closed position when the AUTO activation signals AUTO1 and AUTO2 become asserted (e.g., the autonomous driving mode is engaged). In the open position, the relays 530 and 540 may couple the manual input mechanism to the VCP (e.g., and decouple the signal generator 520 from the VCP). In the closed position, the relays 530 and 540 may couple the signal generator 530 to the VCP (e.g., and decouple the manual input mechanism from the VCP). Accordingly, the VCP may receive the MAN input signals 502 when the autonomous driving mode is disengaged, and may receive the AUTO input signals 503 when the autonomous driving mode is engaged.

The MAN input signals 502 and AUTO input signals 503 may be used to control a particular vehicle operation. For example, the input signals 502 and 503 may specify an amount and/or direction of input to be applied to a mechanical component of the autonomous vehicle (e.g., engine and/or motor, brakes, front wheels, etc.). The VCP may execute the vehicle operation (e.g., accelerating, braking, steering, etc.) by applying the corresponding inputs to the mechanical component (e.g., increasing the engine/motor output, applying pressure on the brakes, turning the front wheels, etc.). In example implementations, the AUTO input signals 503 may be of the same or similar format as the MAN input signals 502 and thus indistinguishable to the VCP.

In some aspects, the vehicle operation controller 510 may include a watchdog component 512 that monitors the "health" or condition of the vehicle operation controller 510. For example, the watchdog component 512 may ensure that the vehicle operation controller 510 is able to receive and process CTRL signals. In some aspects, the watchdog component 512 may detect MAN input signals from a manual input mechanism. The watchdog component 512 may assert a ready signal 504 if the vehicle operation controller 510 is able to receive and process CTRL signals and no MAN input signals are detected. On the other hand, the watchdog component 512 may deassert the ready signal 504 upon detecting a MAN input signal and/or determining that the vehicle operation controller is unable to receive or process CTRL signals.

The signal generator 520 may also include a watchdog component 522 that monitors the health or condition of the signal generator 520. For example, the watchdog component 522 may ensure that the signal generator 520 is able to receive and process instructions from the vehicle operation controller 510 (e.g., and generate AUTO input signals 503). The watchdog component 522 may assert a ready signal 505 if the signal generator 520 is able to properly generate the AUTO input signals 503. On the other hand, the watchdog component 522 may deassert the ready signal 505 upon determining that that signal generator 520 is not able to properly generate the AUTO input signals 503.

The ready signals 504 and 505 may be combined, via a logic gate 550, with the AUTO activation signals AUTO1 and AUTO2. For example, the logic gate 550 may combine the ready signals 504 and 505 and AUTO activation signals AUTO1 and AUTO2, using AND logic, to produce an output enable (Output_EN) signal 501. Accordingly, the output enable signal 501 may be asserted only when the ready signals 504 and 505 and AUTO activation signals AUTO1 and AUTO2 are concurrently asserted. The output enable signal 501 may be fed back to the signal generator 520, and may be used to enable and/or disable the signal generator 520 from outputting the AUTO input signals 503. For example, the signal generator 520 may output the AUTO input signals 503 when the output enable signal 501 is asserted, and may be prevented from outputting the AUTO input signals 503 when the output enable signal 501 is deasserted.

In some aspects, the output enable signal 501 may be further provided to an AUTO_CHAIN (e.g., AUTO_CHAIN 405) used to enable and/or disable the autonomous drive mode. For example, with reference to FIG. 4, the output enable signal 501 may cause the fault detection circuit of a given one of the interface modules 420-460 to open a respective pair of relays coupled to the AUTO_CHAIN 405 (e.g., thus breaking the AUTO_CHAIN 405). More specifically, the fault detection circuit may open the corresponding pair of relays if the output enable signal 501 becomes deasserted (e.g., from an asserted state) and/or remains deasserted for a threshold duration. On the other hand, the fault detection circuit may maintain the pair of relays in the closed position while the output enable signal 501 remains asserted.

Methodology

Figure 6:
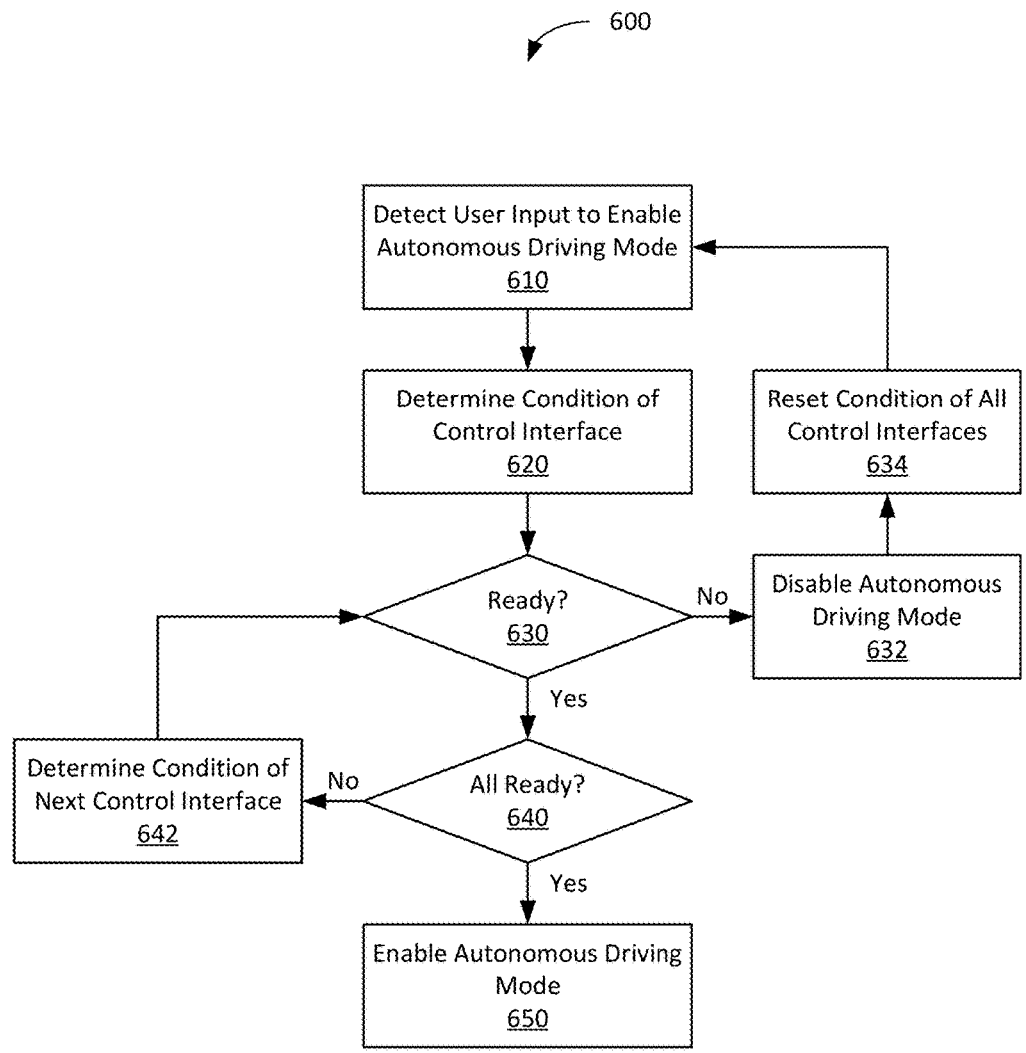
FIG. 6 shows a flowchart depicting an operation of enabling an autonomous driving mode, in accordance with example implementations.

FIG. 6 shows a flowchart depicting an operation 600 for enabling an autonomous driving mode, in accordance with example implementations. The operation 600 may be implemented, for example, by the vehicle interface subsystem 90 and, more specifically, the autonomy controller 84 of FIG. 1. Accordingly, references made to the elements of FIG. 1 are for purposes of illustrating a suitable element or component for performing a step or sub-step being described.

The autonomy controller 84 first detects a user input to enable an autonomous driving mode (610). The user input may signal a request to enable the autonomous driving mode. For example, the autonomy controller 84 may detect a user interaction with an AUTO enable button or switch (e.g., AUTO enable button 210 of FIG. 1). As described above with respect to FIG. 2, the user interaction may correspond to a user pulling the AUTO enable button 210 (e.g., so that the AUTO enable button 210 is in an "up" or "on" position).

In response to the user input, the autonomy controller 84 may determine a condition of a selected control interface (620). For example the selected control interface may correspond to one of the control interfaces 92-99 that control respective vehicle operations (e.g., braking, acceleration, steering, shifting, etc.) of the autonomous vehicle. In some aspects, the autonomy controller 84 may determine whether the selected control interface is in a "ready" condition (630). The ready condition may indicate that the selected control module capable of safely assuming control of the corresponding vehicle operation. For example, the selected control interface may be in the "ready" condition if its software is functioning properly, is able to communicate with the autonomy controller 84 and/or other control modules 92-99, and no manual override (e.g., from a manual input mechanism) has been detected.

If the selected control interface is in the "ready" condition (as tested at 630), the autonomy controller 84 may then determine whether an AUTO_CHAIN (AC) has been activated (640). For example, as shown in FIG. 4, the control interfaces (e.g., interface modules 420-460) may be coupled in series to an AUTO_CHAIN (e.g., AUTO_CHAIN 405). Thus, in example implementations, the AUTO_CHAIN may become activated when each of the control interfaces is in the "ready" condition. If the AUTO_CHAIN is not activated, the autonomy controller 84 may select another control interface (642) and determine the condition of the newly selected control interface (620). For example, the newly selected control interface may correspond to the next control interface coupled, in series, to the AUTO_CHAIN.

If a selected control interface is not in the "ready" condition (as tested at 630), the autonomy controller 84 may disable the autonomous driving mode (632) and reset the "ready" condition of all other control interfaces (634). In example implementations, the autonomous driving mode may remain disabled until the autonomy controller 84 detects a subsequent user input to enable (or re-enable) the autonomous driving mode (610). For example, this may require the autonomy controller 84 to check (or re-check) the condition of each of the control interfaces each time the user wishes to enable the autonomous driving mode (e.g., to ensure that the interface controllers are properly functioning at the same time).

Once the AUTO_CHAIN is activated (as tested at 640), the autonomy controller 84 may enable the autonomous driving mode (650). In some aspects, the autonomy controller 84 may activate a status indicator to signal to the user that the autonomous driving mode is enabled. As described above with respect to FIG. 3, the autonomous driving mode may be engaged or activated in multiple stages (e.g., to ensure a safe transition from manual operation). Thus, once the autonomous driving mode is enabled, the autonomy controller 84 may assume control over the vehicle's operations (e.g., in an autonomous manner) immediately upon detecting an AUTO engage input from the user. As described above with respect to FIG. 2, the AUTO engage input may correspond to a user pressing the AUTO engage button 220.

Figure 7:
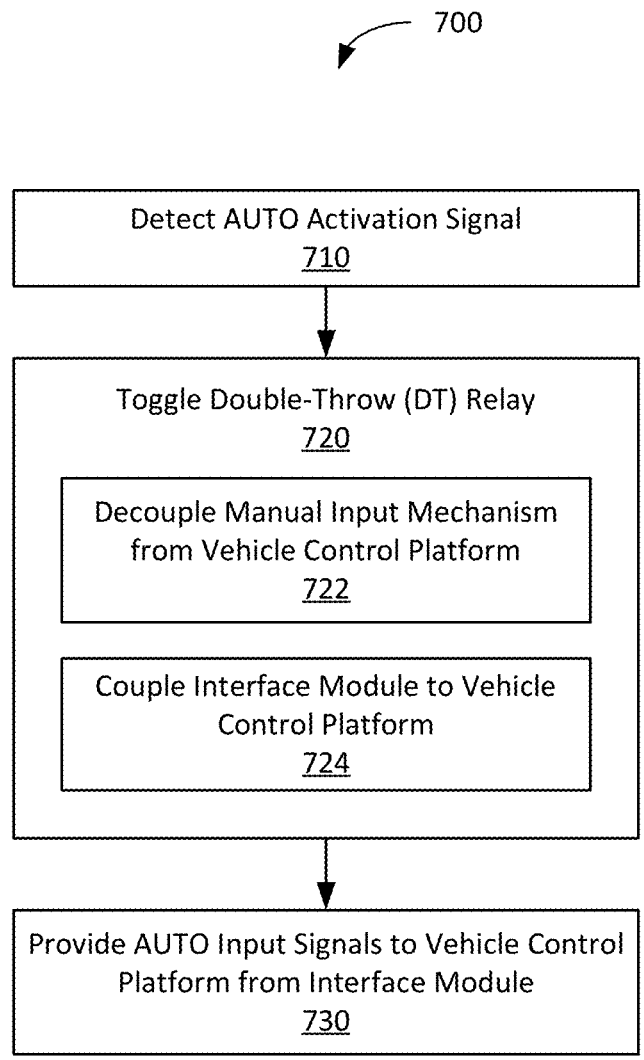
FIG. 7 shows a flowchart depicting an operation for switching control of a vehicle operation between manual and autonomous inputs, in accordance with example implementations.

FIG. 7 shows a flowchart depicting an operation 700 for switching control of a vehicle operation between manual and autonomous inputs, in accordance with example implementations. The operation 700 may be implemented, for example, by the interface module 500 of FIG. 5. Accordingly, references made to the elements of FIG. 5 are for purposes of illustrating a suitable element or component for performing a step or sub-step being described.

The interface module 500 first detects one or more autonomy (AUTO) activation signals (710). The AUTO activation signals may indicate that an autonomous driving mode has been engaged or activated. For example, the interface module 500 may receive the AUTO activation signals AUTO1 and AUTO2 from the autonomy controller 84 of FIG. 1 and/or the latch 470 of FIG. 4 (e.g., corresponding to AUTO activation signals 406). Thus, in example implementations, the AUTO activation signals AUTO1 and AUTO2 may be asserted only if the interface module 500 (e.g., and any other interface modules in the vehicle interface subsystem) is able to safely assume control of a respective vehicle operation.

The interface module 500 responds to the AUTO activation signals by toggling one or more double-throw (DT) relays that selectively couple the interface module 500 to a vehicle control platform (720). For example, the relays 530 and 540 may switchably couple the vehicle control platform (VCP) to the signal generator 520 or a manual input mechanism. The relays 530 and 540 may be in an open position or a closed position depending on the state of the AUTO activation signals AUTO1 and AUTO2. In example implementations, the relays 530 and 540 may be in the open position while the AUTO activation signals AUTO1 and AUTO2 are deasserted (e.g., the autonomous driving mode is disengaged), and may switch to the closed position when the AUTO activation signals AUTO1 and AUTO2 are asserted (e.g., the autonomous driving mode is engaged).

Thus, upon detecting the AUTO activation signals, the interface module 500 may decouple a manual input mechanism from the VCP (722) and couple the interface module 500 to the VCP (724). For example, the relays 530 and 540 may couple the manual input mechanism to the VCP when toggled to the open position, and may couple the signal generator 520 to the VCP when toggled to the closed position. In example implementations, assertion of the AUTO activation signals AUTO1 and AUTO2 causes the relays 530 and 540 to close, thus coupling the signal generator 520 to the VCP while decoupling the manual input mechanism from the VCP.

The interface module 500 may then provide autonomy (AUTO) input signals to the VCP (730). For example, when the relays 530 and 540 are in the closed position, the VCP may receive AUTO input signals 503 from the signal generator 520, in lieu of MAN input signals 502 that would otherwise be provided by the manual input mechanism. The AUTO input signals 503 may be used to control a particular vehicle operation. For example, the AUTO input signals 503 may specify an amount and/or direction of input to be applied to a mechanical component of the autonomous vehicle (e.g., engine and/or motor, brakes, front wheels, etc.). The VCP may execute the vehicle operation (e.g., accelerating, braking, steering, etc.) by applying the corresponding inputs to the mechanical component (e.g., increasing the engine/motor output, applying pressure on the brakes, turning the front wheels, etc.).

Hardware Diagram

Figure 8:
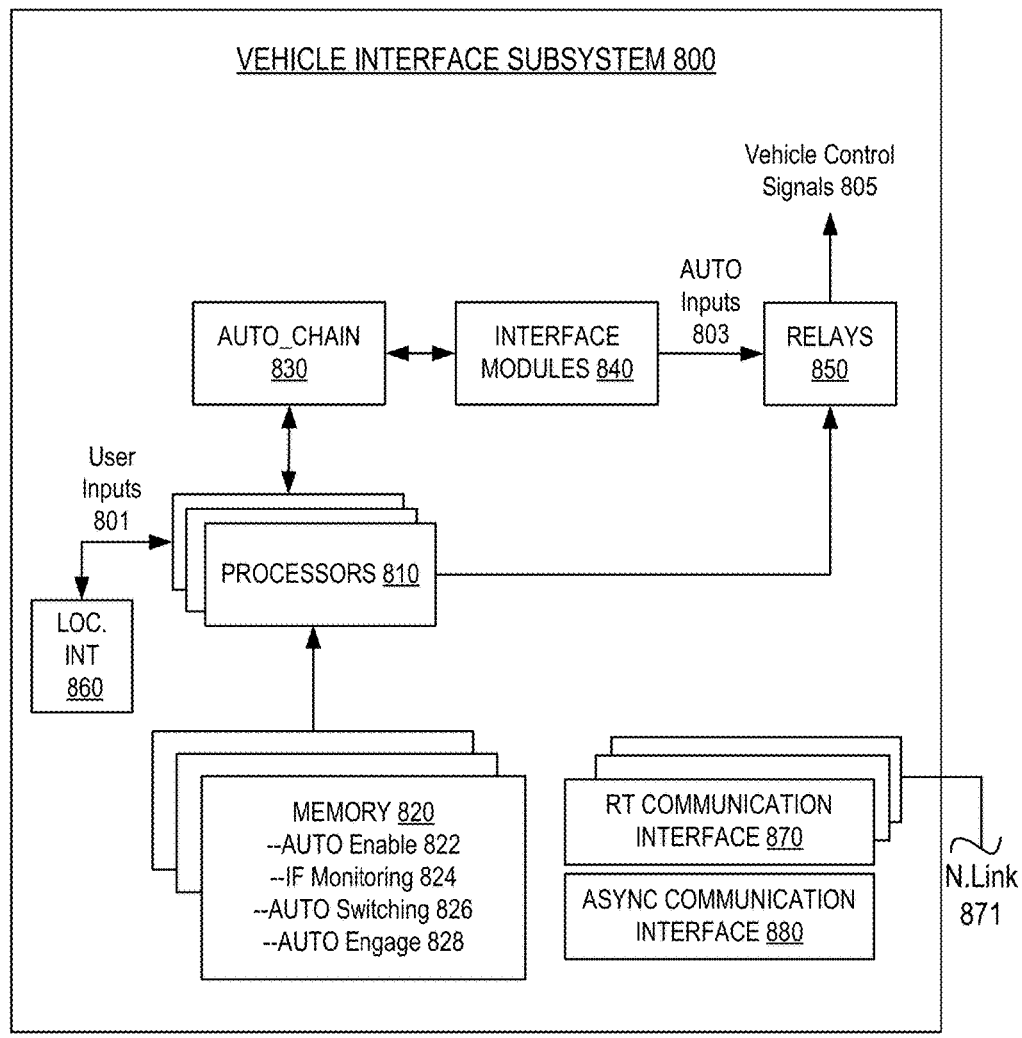
FIG. 8 shows a block diagram of vehicle interface subsystem for an autonomous vehicle, in accordance with example implementations.

FIG. 8 shows a block diagram of vehicle interface subsystem (VIS) 800 for an autonomous vehicle, in accordance with example implementations. The VIS 800 may be implemented using one or more processors 810, memory resources 820, interface modules 840, and relays 850. In the context of FIGS. 1, 4, and 5, VIS 90, VIS 400, and/or interface module 500 may be implemented using one or more components of the VIS 800.

According to some examples, the VIS 800 may be implemented within an autonomous vehicle with software and hardware resources such as described with examples of FIG. 1-5. In an example shown, the VIS 800 may be distributed spatially into various regions of a vehicle. For example, the processors 810 and/or memory resources 820 may be provided in the trunk of a vehicle. The relays 850 may be coupled in-line with one or more mechanical input mechanisms (not shown for simplicity). Various processing resources of the VIS 800 may also include an AUTO_CHAIN 830, which may be implemented using microprocessors and/or integrated circuits.

In an example of FIG. 8, the VIS 800 may include a local communication interface 860 (or series of local links) to vehicle interfaces and other resources of an autonomous vehicle. In one implementation, the local communication interface 860 may provide a local link to one or more user input mechanisms for enabling and/or engaging an autonomous driving mode of the autonomous vehicle (e.g., an AUTO enable button, an AUTO engage button, etc.). For example, the processor 810 may receive user inputs 801 via the local communication interface 860. The VIS 800 may further include multiple communication interfaces, such as real-time (RT) communication interface 870 and asynchronous (ASYNC) communication interface 880. The various communication interfaces 870 and 880 may send and receive communications to other vehicles, central services, human assistance operators, or other remote entities for a variety of purposes.

One or more of the communication interfaces 870 and/or 880 may enable the autonomous vehicle to communicate with one or more networks (e.g., cellular network) through use of a network link 871, which may be a wireless or wired communication channel. In some aspects, the VIS 800 may establish and use multiple network links 871 at the same time. Using the network link 871, the VIS 800 may communicate with one or more remote entities, such as network services or human operators. In one implementation, the real-time communication interface 870 may be optimized to communicate information instantly, or in real-time, to remote entities (e.g., human assistance operators). In contrast, the asynchronous communication interface 880 may communicate information at predetermined intervals and/or according to a schedule (e.g., vehicle status updates, software updates, etc.).

The memory resources 820 may include, for example, main memory, a read-only memory (ROM), storage device, and cache resources. The main memory of memory resources 820 may include random access memory (RAM) or other dynamic storage device, for storing information and instructions that are executable by the processors 810. The main memory may also store temporary variables or other intermediate information which may be used during the execution of instructions by one or more of the processors 810. The memory resources 820 may also include ROM or other static storage device for storing static information and instructions for one or more of the processors 810. Still further, the memory resources 820 may include other forms of memory devices and components, such as a magnetic disk or optical disk, for purpose of storing information and instructions for use by one or more of the processors 810.

According to some examples, the memory 820 may store a plurality of software instructions including, for example, autonomy (AUTO) enable software 822, interface (IF) monitoring software 824, AUTO switching software 826, and an AUTO engage software 828. During runtime (e.g., when the vehicle is operational), the software instructions 822-826 may be executed by one or more of the processors 810 and/or interface modules 840 in order to implement functionality such as described with respect to the autonomous vehicle control system 100 of FIG. 1, the vehicle interface subsystem 400 of FIG. 4, and/or the interface module 500 of FIG. 5.

For example, in operating an autonomous vehicle, the one or more processors 810 may execute the AUTO enable software 822 to enable the autonomous driving mode (e.g., as described above with respect to FIGS. 1-4 and 6). For example, the one or more processors 810 may execute the AUTO enable software 822 in response to a user input 801 requesting activation of the autonomous driving mode (e.g., corresponding to the user pulling on the AUTO enable button 210 of FIG. 2). In executing the AUTO enable software 822, the one or more processors 810 may perform a system check to determine the condition of each of the interface modules 840 (e.g., to determine whether each of the interface modules 840 is in a "ready" condition).

The interface modules 840, in combination with the one or more processors 810, may execute the IF monitoring software 824 to determine whether each of the interface modules 840 is able to safely assume control of a respective vehicle operation (e.g., as described above with respect to FIGS. 4 and 6). For example, in executing the IF monitoring software 824, the one or more processors 810 may determine whether each of the interface modules 840 is functioning properly and is able to communicate with the processor 810 and/or other interface modules 840. In some aspects, the one or more processors 810 may activate the AUTO_CHAIN 830 upon determining that each of the interface modules 840 is in the "ready" condition. The AUTO_CHAIN 830, when activated, may cause each of the interface modules 840 to begin generating AUTO input signals 803 that may be used to control respective vehicle operations of the autonomous vehicle.

The relays 850, in combination with the one or more processors 810, may execute the AUTO switching software 826 to transition control of one or more vehicle operations to the interface modules 840 (e.g., as described above with respect to FIGS. 1, 5, and 7). For example, in executing the AUTO switching software 826, the one or more processors 810 may toggle the relays 850 to selectively couple the interface modules 840 to a vehicle control platform (not shown for simplicity). In example implementations, the relays 850 may be electromechanical double-throw (DT) relays that switchably couple the vehicle control platform to the interface modules 840 or one or more mechanical input mechanisms. In executing the AUTO switching software 826, the one or more processors 810 may further cause the relays 850 to decouple the one or more manual input mechanisms from the vehicle control platform.

The interface modules 840, in combination with the one or more of processors 810, may execute the AUTO engage software 828 to engage or activate the autonomous driving mode (e.g., as described above with respect to FIGS. 1-7). For example, the one or more processors 810 may execute the AUTO engage software 826 in response to a user input 801 engaging or activating of the autonomous driving mode (e.g., corresponding to the user pressing the AUTO engage button 220 of FIG. 2). In executing the AUTO engage software 826, the interface modules 840 may output the AUTO input signals 803 to the vehicle control platform (e.g., as vehicle control signals 805). Thus, upon engaging the autonomous driving mode, the vehicle control platform may receive the vehicle control signals 805 from the interface modules 840 in lieu of the manual input mechanisms.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method of controlling a vehicle operation of an autonomous vehicle, the method comprising:
   using a fault detection component, monitoring an autonomy controller while the autonomous vehicle is in a manual driving mode and prior to detecting an autonomy activation signal, the autonomy controller being operable to control the vehicle operation when the autonomous vehicle is in an autonomous driving mode;
   detecting the autonomy activation signal to enable the autonomy controller to control the vehicle operation;
   in response to the autonomy activation signal, determining, using the fault detection component, whether the autonomy controller is in a ready condition;
   in response to determining that the autonomy controller is in the ready condition, coupling the autonomy controller to a vehicle control platform configured to manage the vehicle operation;
   receiving input signals from the autonomy controller to autonomously control the vehicle operation; and
   based on the autonomy controller being coupled to the vehicle control platform, providing the input signals to the vehicle control platform from the autonomy controller to enable autonomous control of the vehicle operation.

2. The method of claim 1, wherein the vehicle operation corresponds to a braking, steering, shifting, or throttle operation of the autonomous vehicle.

3. The method of claim 1, further comprising:
   based on the autonomy controller being in the ready condition, decoupling a manual input mechanism from the vehicle control platform.

4. The method of claim 3, wherein coupling the autonomy controller to the vehicle control platform comprises:
   toggling a relay that switchably couples the vehicle control platform to one of the autonomy controller or the manual input mechanism.

5. The method of claim 4, wherein the relay is a double-throw (DT) electromechanical relay having a normally open position and a closed position.

6. The method of claim 5, wherein the vehicle control platform is coupled to receive the input signals from the manual input mechanism when the relay is in the normally open position.

7. The method of claim 6, wherein toggling the relay comprises:
   closing the relay to enable the vehicle control platform to receive the input signals from the autonomy controller.

8. The method of claim 1, further comprising:
   detecting an autonomy deactivation signal to disable the autonomy controller; and
   in response to the autonomy deactivation signal, decoupling the autonomy controller from the vehicle control platform.

9. The method of claim 1, wherein the autonomy activation signal indicates a standby state for the vehicle operation, the standby state corresponding to the autonomy controller being able to safely assume control of the vehicle operation.

10. The method of claim 1, wherein the autonomy controller corresponds to one of a plurality of autonomy controllers for the autonomous vehicle, and wherein the autonomy activation signal indicates that each of the plurality of autonomy controllers is able to safely assume control of a respective vehicle operation.

11. A control interface for a vehicle operation of an autonomous vehicle, the control interface comprising:
one or more processors; and
a memory storing instructions that, when executed by the one or more processors, cause the control interface to:
using a fault detection component, monitor an autonomy controller while the autonomous vehicle is in a manual driving mode and prior to detecting an autonomy activation signal, the autonomy controller being operable to control the vehicle operation when the autonomous vehicle is in an autonomous driving mode;
detect the autonomy activation signal to enable the autonomy controller to control the vehicle operation;
in response to the autonomy activation signal, determine, using the fault detection component, whether the autonomy controller is in a ready condition;
in response to determining that the autonomy controller is in the ready condition, couple the autonomy controller to a vehicle control platform configured to manage the vehicle operation;
receive input signals from the autonomy controller to autonomously control the vehicle operation; and
based on the autonomy controller being coupled to the vehicle control platform, provide the input signals to the vehicle control platform from the autonomy controller to enable autonomous control of the vehicle operation.

12. The control interface of claim 11, wherein the vehicle operation corresponds to a braking, steering, shifting, or throttle operation of the autonomous vehicle.

13. The control interface of claim 11, wherein execution of the instructions further causes the control interface to:
based on the autonomy controller being in the ready condition, decouple a manual input mechanism from the vehicle control platform.

14. The control interface of claim 13, further comprising:
a relay that switchably couples the vehicle control platform to one of the autonomy controller or the manual input mechanism.

15. The control interface of claim 14, wherein the relay is a double-throw (DT) electromechanical relay having a normally open position and a closed position.

16. The control interface of claim 15, wherein the vehicle control platform is coupled to receive the input signals from the manual input mechanism when the relay is in the normally open position.

17. The control interface of claim 16, wherein execution of the instructions to couple the autonomy controller to the vehicle control platform causes the control interface to:
close the relay to enable the vehicle control platform to receive the input signals from the autonomy controller.

18. The control interface of claim 11, wherein execution of the instructions further causes the control interface to:
detect an autonomy deactivation signal to disable the autonomy controller;
in response to the autonomy deactivation signal, decouple the autonomy controller from the vehicle control platform.

19. The control interface of claim 11, wherein the autonomy activation signal indicates a standby state for the vehicle operation, the standby state corresponding to the autonomy controller being able to safely assume control of the vehicle operation.

20. A non-transitory computer-readable medium storing instructions that, when executed by one or more processors of a control interface for a vehicle operation of an autonomous vehicle, cause the control interface to:
using a fault detection component, monitor an autonomy controller while the autonomous vehicle is in a manual driving mode and prior to detecting an autonomy activation signal, the autonomy controller being operable to control the vehicle operation when the autonomous vehicle is in an autonomous driving mode;
detect the autonomy activation signal to enable the autonomy controller to control the vehicle operation;
in response to the autonomy activation signal, determine, using the fault detection component, whether the autonomy controller is in a ready condition;
in response to determining that the autonomy controller is in the ready condition, couple the autonomy controller to a vehicle control platform configured to manage the vehicle operation;
receive input signals from the autonomy controller to autonomously control the vehicle operation; and
based on the autonomy controller being coupled to the vehicle control platform, provide the input signals to the vehicle control platform from the autonomy controller to enable autonomous control of the vehicle operation.

* * * * *